US009670781B2

United States Patent
Halfmann et al.

(10) Patent No.: US 9,670,781 B2
(45) Date of Patent: Jun. 6, 2017

(54) GAS TURBINE ENGINES WITH TURBINE ROTOR BLADES HAVING IMPROVED PLATFORM EDGES

(71) Applicant: HONEYWELL INTERNATIONAL INC., Morristown, NJ (US)

(72) Inventors: Steve Halfmann, Chandler, AZ (US); Mark C. Morris, Phoenix, AZ (US); Jason Smoke, Phoenix, AZ (US); Brandan Wakefield, Phoenix, AZ (US); Bob Mitlin, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 828 days.

(21) Appl. No.: 14/028,734

(22) Filed: Sep. 17, 2013

(65) Prior Publication Data

US 2015/0075178 A1 Mar. 19, 2015

(51) Int. Cl.
*F01D 5/14* (2006.01)
*F01D 5/22* (2006.01)
*F01D 5/30* (2006.01)

(52) U.S. Cl.
CPC ............. *F01D 5/14* (2013.01); *F01D 5/141* (2013.01); *F01D 5/22* (2013.01); *F01D 5/3007* (2013.01); *F05D 2240/80* (2013.01); *F05D 2250/184* (2013.01); *F05D 2250/75* (2013.01); *Y02T 50/673* (2013.01); *Y10T 29/49336* (2015.01)

(58) Field of Classification Search
CPC . F01D 5/143; F01D 5/141; F01D 5/22; F01D 5/225; F01D 11/006; F01D 21/003; F05D 2250/70; F05D 2250/71; F05D 2250/711; F05D 2250/712; F05D 2240/80; F05D 2230/80; F05D 2260/36
See application file for complete search history.

(56) References Cited

U.S. PATENT DOCUMENTS

| | | | |
|---|---|---|---|
| 1,423,466 A | 7/1922 | Snyder | |
| 3,014,695 A * | 12/1961 | Rankin | F01D 5/225 416/191 |
| 4,767,275 A | 8/1988 | Brown | |
| 4,878,811 A * | 11/1989 | Jorgensen | F01D 11/006 416/190 |
| 5,017,091 A * | 5/1991 | Tran | F01D 5/3007 29/889.21 |
| 5,183,389 A | 2/1993 | Gilchrist et al. | |
| 5,813,835 A | 9/1998 | Corsmeier et al. | |
| 6,290,459 B1 * | 9/2001 | Correia | F01D 5/143 415/139 |
| 6,796,408 B2 | 9/2004 | Sherwin et al. | |

(Continued)

FOREIGN PATENT DOCUMENTS

JP 2011074837 A 4/2011

OTHER PUBLICATIONS

EP Extended Search Report for Application No. EP 14175103.2 dated Nov. 24, 2014.

*Primary Examiner* — Eric Keasel
*Assistant Examiner* — Joshua R Beebe
(74) *Attorney, Agent, or Firm* — Lorenz & Kopf, LLP (57) ABSTRACT

A turbine rotor blade is provided. The turbine rotor blade includes a root, a platform coupled to the root, and an airfoil extending from the platform. The platform has a leading edge, a trailing edge, a suction side edge, and a pressure side edge. The pressure side edge includes a first concave portion.

13 Claims, 6 Drawing Sheets

(56) References Cited

U.S. PATENT DOCUMENTS

| | | |
|---|---|---|
| 7,186,089 B2 | 3/2007 | Liang |
| 7,200,453 B2 | 4/2007 | Knight et al. |
| 7,519,215 B2 | 4/2009 | Gower |
| 7,751,917 B2 | 7/2010 | Rees et al. |
| 7,974,791 B2 | 7/2011 | Broddegaard et al. |
| 8,209,839 B1 * | 7/2012 | Brostmeyer ............ F01D 5/005 29/407.05 |
| 8,291,589 B2 * | 10/2012 | Davis ..................... B23P 6/002 29/402.01 |
| 2003/0044282 A1 * | 3/2003 | Zhu ........................ F01D 5/143 416/193 A |
| 2004/0225482 A1 | 11/2004 | Vladimirov et al. |
| 2007/0020102 A1 * | 1/2007 | Beeck ................... F01D 5/3007 416/219 R |
| 2009/0304516 A1 | 12/2009 | Couch et al. |
| 2010/0040460 A1 * | 2/2010 | Spangler ................ F01D 5/147 415/191 |
| 2010/0166558 A1 * | 7/2010 | Siden ..................... F01D 5/145 416/193 R |
| 2010/0284819 A1 * | 11/2010 | Mitlin .................... F01D 5/143 416/243 |
| 2012/0026323 A1 | 2/2012 | George |
| 2012/0051921 A1 * | 3/2012 | Reno ........................ F01D 5/22 416/219 R |
| 2012/0271598 A1 | 10/2012 | Cone |
| 2013/0004315 A1 * | 1/2013 | Beeck .................... F01D 5/143 416/193 A |

* cited by examiner

GAS TURBINE ENGINES WITH TURBINE ROTOR BLADES HAVING IMPROVED PLATFORM EDGES

STATEMENT REGUARDING FEDERALLY SPONSORED RESEARCH OR DEVELOPMENT

This invention was made with Government support under W911W6-08-2-0001 awarded by the US Army. The Government has certain rights in the invention.

TECHNICAL FIELD

The present invention generally relates to gas turbine engines, and more particularly relates to gas turbine engines with turbine rotor blades having improved platform edges.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool or otherwise manage the temperature characteristics of the rotor blades to prevent or reduce adverse impact and extend useful life. Mechanisms for cooling turbine rotor blades include ducting cooling air through internal passages and then venting the cooling air. Internal and film cooling techniques attempt to maintain temperatures that are suitable for material and stress level. However, given the high temperature of engine operation, thermal management remains a challenge, particularly in areas such as the platform edges.

Accordingly, it is desirable to provide gas turbine engines, particularly the turbine rotor blades, with improved thermal management. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine rotor blade is provided. The turbine rotor blade includes a root, a platform coupled to the root, and an airfoil extending from the platform. The platform has a leading edge, a trailing edge, a suction side edge, and a pressure side edge. The pressure side edge includes a first concave portion.

In accordance with another exemplary embodiment, a method is provided for producing a turbine rotor blade. The method includes performing a plastic analysis of a blade platform of a baseline turbine rotor blade with a first side edge and a second side edge; identifying a first area with plasticity greater than a predetermined limit on the first side edge; modifying the baseline turbine rotor blade to result in an intermediate turbine rotor blade by removing the first area from the first side edge and adding a second area, corresponding in size and shape to the first area, to the second side edge; and finishing the intermediate turbine rotor blade as a final turbine rotor blade.

In accordance with another exemplary embodiment, a gas turbine engine includes a compressor section configured to receive and compress air; a combustion section coupled to the compressor section and configured to receive the compressed air, mix the compressed air with fuel, and ignite the compressed air and fuel mixture to produce combustion gases; and a turbine section coupled to the combustion section and configured to receive the combustion gases. The turbine section defines a combustion gas path and includes a turbine rotor blade positioned within the combustion gas path. The turbine rotor includes a root, a platform coupled to the root, and an airfoil extending from the platform. The platform has a leading edge, a trailing edge, a suction side edge, and a pressure side edge. The pressure side edge includes a first concave portion.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved thermal management. In particular, exemplary embodiments include turbine rotor blades with platforms having pressure and suction side edges with shapes that improve thermal management in the form of improved temperature, stress, and plasticity characteristics. As examples, the platform edges may have concave and convex portions.

Figure 1:
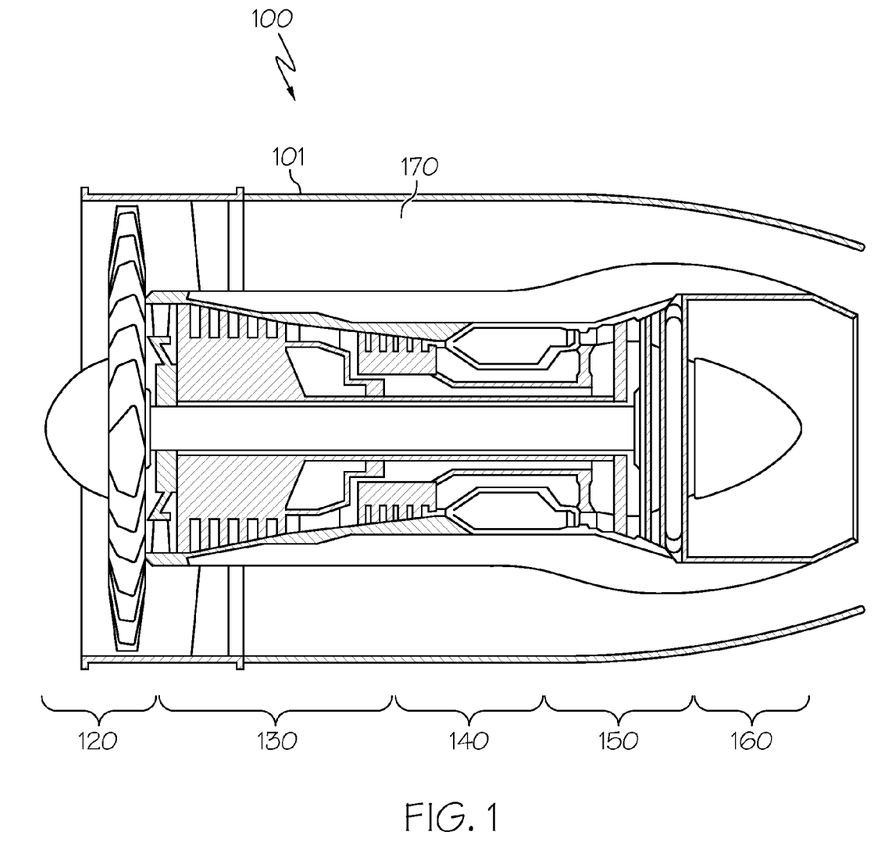
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
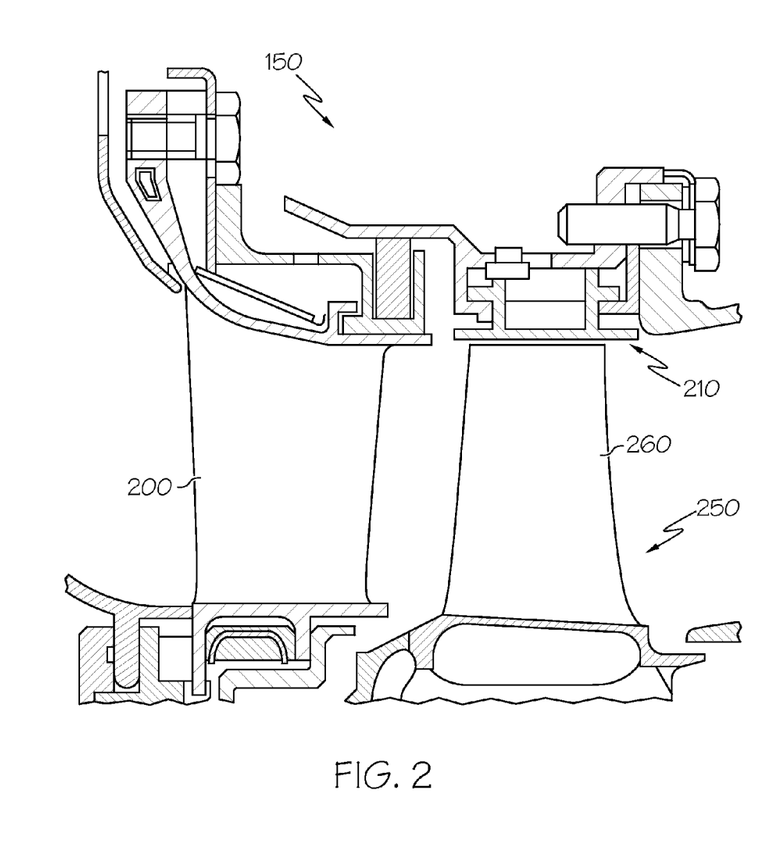
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream combustion section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled, including the rotor 250 and the stator 200, as described in greater detail below.

Figure 3:
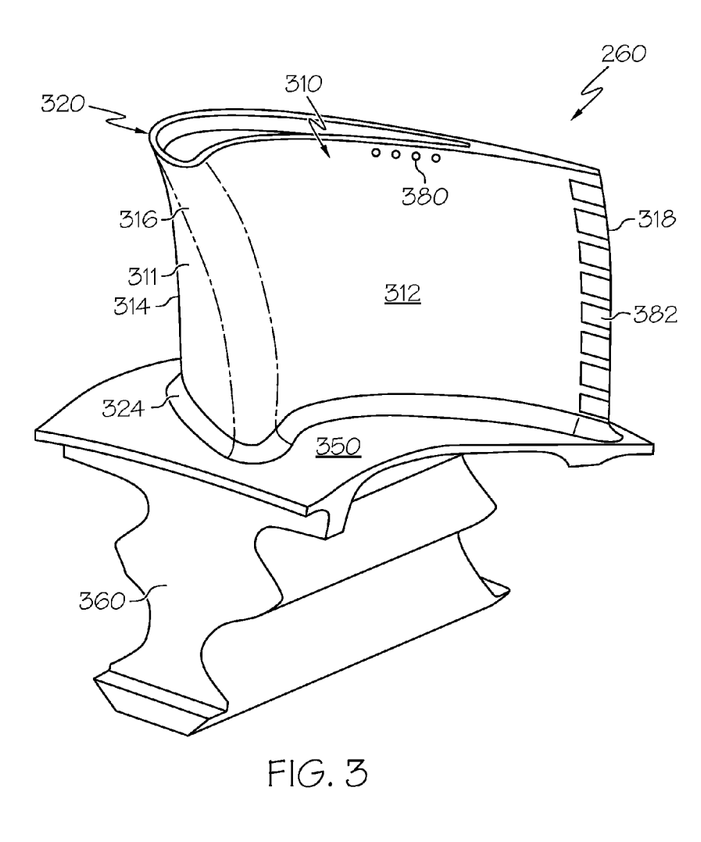
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends radially from the underside of the platform and is configured to couple the rotor blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The platform 350 is discussed in greater detail below. The airfoil 310 is formed by a body 311 with two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 may include trailing edge slots 382.

In a radial direction, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction.

As noted above, the rotor blade 260 is subject to extremely high temperatures resulting from high velocity hot gases ducted from the combustion section 140 (FIG. 2). If unaddressed, the extreme heat may affect the useful life of an airfoil and/or impact the maximum operating temperature of the engine. As such, cooling may be provided for the airfoil 310 to maintain blade temperature at an acceptable level. Such cooling may include an internal cooling system that directs cooling air from the compressor section 130 into inlets in the root 360 and through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, although film cooling holes 380 may be provided in other locations, such as in the area of the leading edge 316 or at any chordwise location along the pressure side wall 312 and/or suction side wall 314. Although not shown, the platform 350 may include one or more stiffening ribs or cooling channels may be provided on the platform 350 to enhance thermal management. For example, the stiffening ribs may extend from the root 360 along the underside of the platform 350. Other mechanisms for improving thermal management of the platform 350 will now be discussed.

Figure 4:
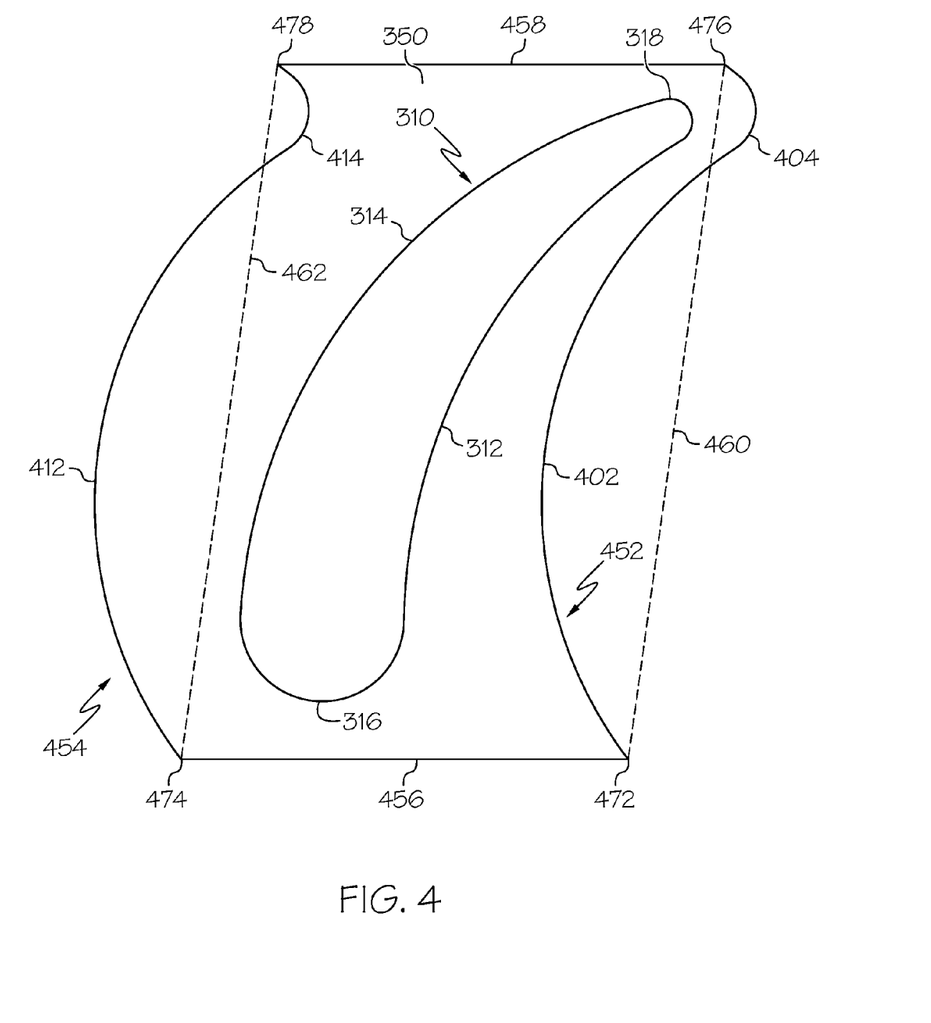
FIG. 4 is a top plan view of the turbine rotor blade of FIG. 3 in accordance with an exemplary embodiment.

FIG. 4 is a top plan view of the turbine rotor blade 260 of FIG. 3 in accordance with an exemplary embodiment. FIG. 4 particularly depicts the platform 350 and the position of the airfoil 310 on the platform 350. As noted above, the airfoil 310 is formed by the pressure side wall 312 and suction side wall 314 joined at the leading and trailing edges 316, 318.

The platform 350 is delineated by a pressure side platform edge 452, a suction side platform edge 454, a leading platform edge 456, and a trailing platform edge 458. The leading and trailing platform edges 456, 458 typically extend in straight line in a circumferential direction with the leading platform edge 456 being forward of the trailing platform edge 458 relative to the direction of gas flow. Each of the leading and trailing platform edges 456, 458 may be considered to have ends or termini 472, 474, 476, 478 that join the leading and trailing platform edges 456, 458 to the pressure side and suction side platform edges 452, 454. For example, the leading platform edge 456 extends from a pressure side end 472 to a suction side end 474, and the trailing platform edge 458 extends from a pressure side end 476 to a suction side end 478. For reference, FIG. 4 additionally depicts dashed baselines 460, 462, which correspond to imaginary lines extending between pressure side ends 472, 476 and between suction side ends 474, 478. The baselines 460, 462 generally extend in an axial direction, although in some embodiments, the baselines 460, 462 may be angled relative to the axial direction.

The pressure side platform edge 452 is positioned on the pressure side of airfoil 310, e.g., on the same side as the pressure side wall 312, and the suction side platform edge 454 is positioned on the suction side of the airfoil 310, e.g., on the same side as the suction side wall 314. The pressure side platform edge 452 and suction side platform edge 454 generally extend in an axial direction. However, the pressure side platform edge 452 and suction side platform edge 454 have curved portions (e.g., portions 402, 404, 412, 414). In one exemplary embodiment, the pressure side platform edge 452 and suction side platform edge 454 are continuously curved from the leading platform edge 456 to the trailing platform edge 458, although in other embodiments, the pressure side platform edge 452 and suction side platform edge 454 may include straight and/or angled portions.

As shown, the pressure side platform edge 452 includes a concave portion 402 extending from the leading platform edge 456 (e.g., at pressure side end 472). In some embodiments, there may be a relatively straight or axial portion between the pressure side end 472 and the concave portion 402. In general, the concave portion 402 is concave relative to an axial line and/or the baseline 460. The pressure side platform edge 452 further includes a convex portion 404 extending between the concave portion 402 and the trailing platform edge 458 (e.g., at pressure side end 476). The convex portion 404 is convex relative to an axial line and/or the baseline 460. In some embodiments, there may be a relatively straight or axial portion between the convex portion 404 and the pressure side end 476 and/or between the concave portion 402 and the convex portion 404. In the depicted exemplary embodiment, the pressure side platform edge 452 has a continuous curvature, e.g. with no straight portions or angled portions.

The pressure side wall 312 of the airfoil 310 may have an aerodynamic or chordwise radius of curvature, typically selected for engine performance or efficiency. In general, the pressure side platform edge 452 is non-parallel to the pressure side wall 312 of the airfoil 310, e.g., with a non-aerodynamic or non-chordwise radius (or radii) of curvature. In particular, the concave portion 402 of the pressure side platform edge 452 has a different radius (or radii) of curvature relative to the pressure side wall 312.

In general, the suction side platform edge 454 is parallel to the pressure side platform edge 452. As such, the pressure side platform edge 452 may sealingly or closely mate with a corresponding suction side platform edge of a first adjacent rotor blade (not shown), and the suction side platform edge 454 may sealingly or closely mate with a corresponding pressure side platform edge of a second adjacent rotor blade (not shown). As noted above, a number of rotor blades are coupled to a rotor disk to form a circumferential ring of rotor blades.

As such, the suction side platform edge 454 includes a convex portion 412 extending from the leading platform edge 456 (e.g., at suction side end 474). In some embodiments, there may be a relatively straight or axial portion between the suction side end 474 and the convex portion 412. In general, the convex portion 412 is convex relative to an axial line and/or the baseline 462. As noted above, the convex portion 412 of the suction side platform edge 454 is parallel to the concave portion 402 of the pressure side platform edge 452. The suction side platform edge 454 further includes a concave portion 414 extending between the convex portion 412 and the trailing platform edge 458 (e.g., at suction side end 478). The concave portion 414 is concave relative to an axial line and/or the baseline 462. As noted above, the concave portion 414 of the suction side platform edge 454 is parallel to the convex portion 404 of the pressure side platform edge 452. In some embodiments, there may be a relatively straight or axial portion between the concave portion 414 and the suction side end 478 and/or between the convex portion 412 and the concave portion 414. In the depicted exemplary embodiment, the suction side platform edge 454 has a continuous curvature, e.g. with no straight portions or angled portions.

Additional details about the pressure side platform edge 452 and the suction side platform edge 454 will be provided below. In particular, the design and function of the pressure side platform edge 452 and the suction side platform edge 454 will be discussed.

Figure 5:
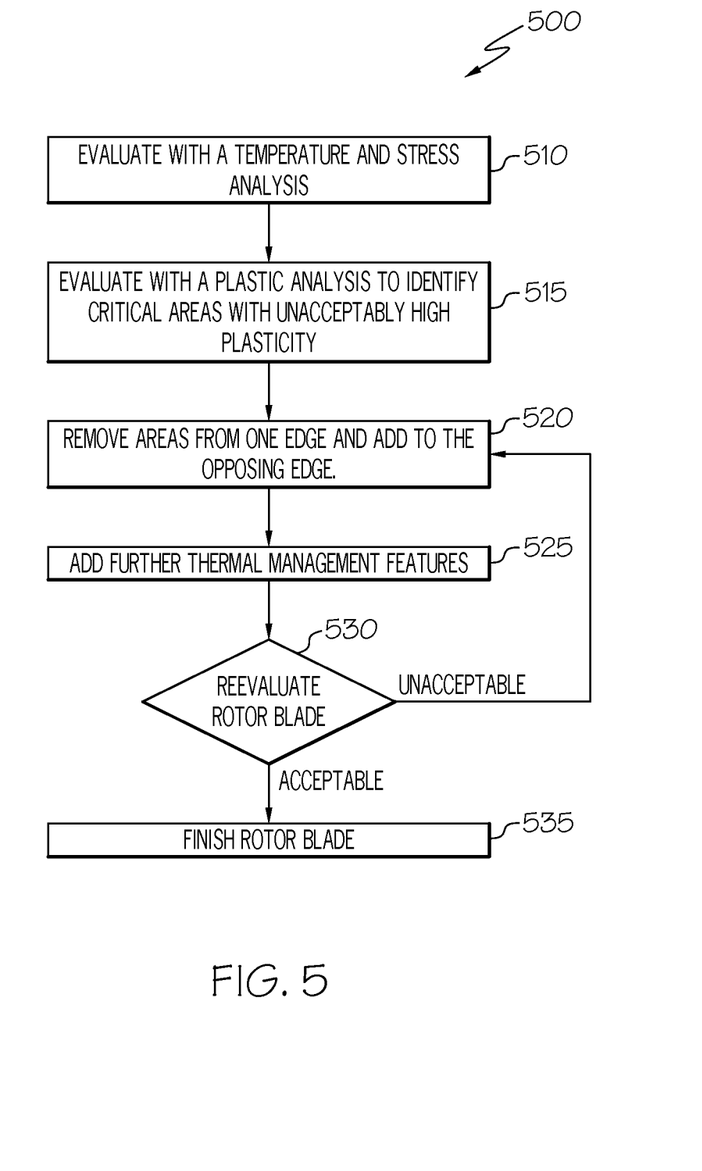
FIG. 5 is a flow chart for producing a turbine rotor blade in accordance with an exemplary embodiment.

FIG. 5 is a flow chart of a method 500 for producing a turbine rotor blade in accordance with an exemplary embodiment. In one exemplary embodiment, the method 500 may be used to produce turbine rotor blade 260, discussed above. As such, FIG. 5 will be discussed with reference to FIGS. 1-4.

Figure 6:
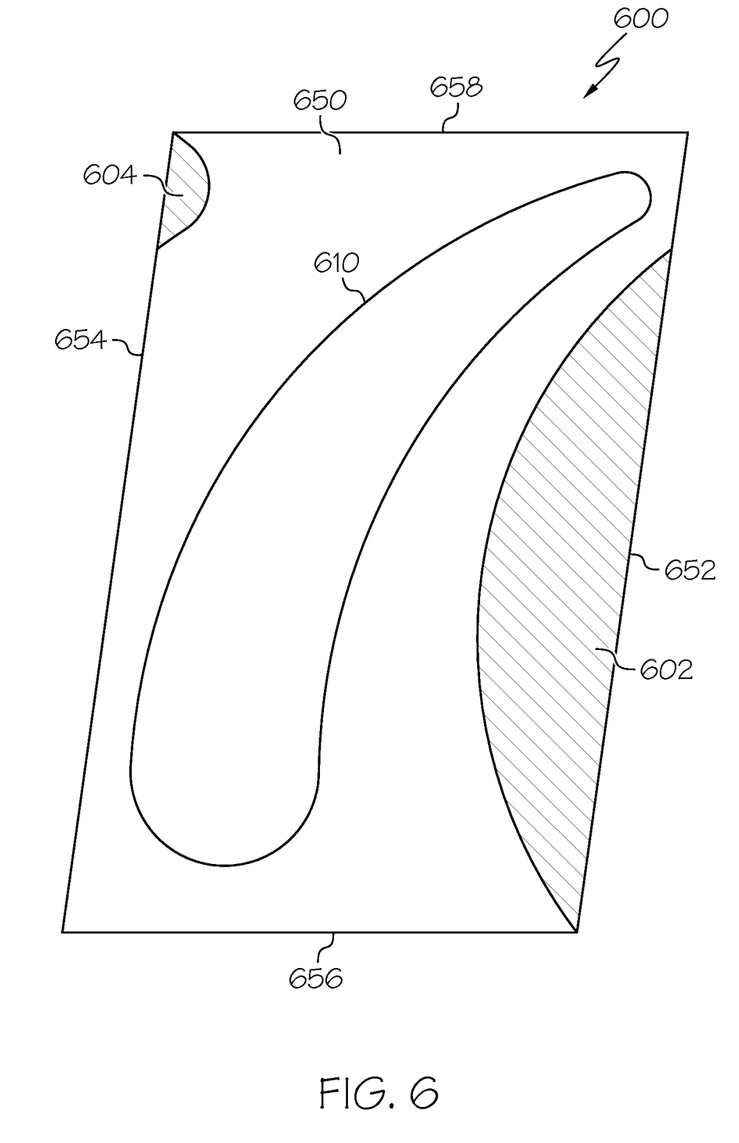
FIG. 6 is an intermediate turbine rotor blade used in the method of FIG. 5 in accordance with an exemplary embodiment.

In a first step 510, a baseline turbine rotor blade is evaluated with a temperature and stress analysis. The temperature analysis may be performed analytically in conjunction with the computational fluid dynamics (CFD) aerodynamic and cooling design utilizing a conjugate heat transfer analysis. One such commercially available CFD code for these analyses is STAR-CCM+™ by CD-adapco. The conjugate heat transfer analysis simultaneously solves the flow path aerodynamics over the external airfoil body 311 and platform 350 and inside the internal cooling circuits, along with the thermal distribution throughout the solid turbine blade 260. The thermal distribution in the solid turbine blade 260 is then input to a structural analysis program that simultaneously accounts for rotational loads, applied loads and reactions, aerodynamic loads, and thermal stresses that result from the temperature gradient in the turbine blade 260. The finite element stress and plasticity analyses may be performed using a commercially available code such as that from ANSYS, Inc. As an example, FIG. 6 depicts a baseline turbine rotor blade 600 having an airfoil 610 and platform 650. As shown, the platform 650 of the baseline turbine rotor blade 600 includes a pressure side platform edge 652, a suction side platform edge 654, a leading platform edge 656, and a trailing platform edge 658. In general, the baseline turbine rotor blade 600 has a pressure side platform edge 652 and a suction side platform edge 654 that corresponds to the baseline platform edges 460, 462 discussed above with reference to FIG. 4. As such, the pressure side platform edge 652 and the suction side platform edge 654 of the baseline turbine rotor blade 600 are generally straight and extend in an axial direction. The thermal and stress analysis may be physically performed and/or may be analytically performed with CFD or finite element analysis as described above.

In a second step 515, the baseline turbine rotor blade is evaluated with a plastic analysis as described above to identify critical areas with unacceptably high plasticity. In general, the areas of high plasticity occur where the combination of stress and temperature exceed the material elastic strength. As such, the areas of high plasticity are a function of location, structural characteristics, stress, and temperature, although the areas of high plasticity are not necessarily the location at which stress or temperature are the highest. Unacceptably high plasticity occurs when the plastic deformation reaches a level that results in unacceptable aerodynamic performance or mechanical risk for the particular application. Unacceptable aerodynamic performance is typically determined when the resulting aerodynamic profile of the deformed turbine blade 260 results in turbine efficiency reduction or system aerodynamic losses such that the overall thermodynamic performance of the engine is no longer acceptable for the intended application. Unacceptable mechanical risk is typically determined when the stress-temperature distributions in the turbine blade 260 result in a component life that is less than acceptable for the intended application or result in a potential for undesirable contact with adjacent static components. Reference is again made to FIG. 6 in which two areas 602, 604 of unacceptably high plasticity are depicted on the platform 650 of rotor blade 600. In particular, FIG. 6 depicts a first area 602 of unacceptably high plasticity on the pressure side of the platform 650 and a second area 604 of unacceptably high plasticity on the suction side of the platform 650.

In a third step 520, the pressure side platform edge and suction side platform edge are redesigned to improve the resulting plasticity. In particular, the areas of unacceptably high plasticity are removed. Considering that the pressure side platform edge and suction side platform edge are parallel, any removed areas from one edge are added to the opposing edge. For example, using the rotor blade 600 of FIG. 6, the first area 602 of unacceptably high plasticity on the pressure side of the platform 650 and the second area 604 of unacceptably high plasticity on the suction side of the platform 650 are removed. Comparing the rotor blade 260 of FIG. 4 and the rotor blade 600 of FIG. 6, removing the first area 602 of the rotor blade 600 results in a concave portion, such as concave portion 402 of FIG. 4, and removing the second area 604 of the rotor blade 600 results in another concave portion, such as concave portion 414 of FIG. 4. Removal of material in areas of unacceptably high plasticity may result in improved plasticity characteristics in the remaining areas, e.g., as a result of the corresponding reduction in distance from cooling holes at the airfoil or airfoil base and the resulting edge, as well as the corresponding reduction in distance between the larger supportive structures such as the airfoil and root and the resulting edge.

As noted above, areas corresponding to the removed areas are added to the opposing side edges. As such, again comparing the rotor blade 260 of FIG. 4 and the rotor blade 600 of FIG. 6, by removing a first area (e.g., removing area 602 of the rotor blade 600 to result in concave portion 402 of FIG. 4) on the pressure side edge, a corresponding convex area (e.g., convex portion 412 of FIG. 4) is added to the suction side. Similarly, by removing a second area (e.g., removing area 604 of the rotor blade 600 to result in concave portion 414 of FIG. 4) on the suction side edge, a corresponding convex area (e.g., convex portion 404 of FIG. 4) is added to the pressure side edge. As such, upon the completion of step 520, the pressure side platform edge 652 and the suction side platform edge 654 of baseline turbine rotor blade 600 may be respectively modified to result in the pressure side platform edge 452 and suction side platform edge 454 of rotor blade 260.

In some embodiments, the method 500 may include an optional step 525 in which additional thermal management features, such as stiffening ribs and/or active cooling, may be added to the rotor blade, including the platform. As noted above, such cooling may include effusion and/or impingement cooling holes.

In a step 530, the rotor blade is reevaluated to determine if the design is acceptable. For example, the temperature, stress, and plasticity analyses are repeated to determine if any areas of unacceptably high plasticity remain. If the modified rotor blade has one or more areas of unacceptably high plasticity, the method 500 returns to step 520. If the modified rotor blade is acceptable, the method 500 proceeds to step 535 in which the modified rotor blade may be finished and the method 500 is complete to result in the turbine rotor blade with curved platform edges as discussed above. Any suitable finishing techniques may be provided, including coatings and other post-production processes.

Accordingly, turbine rotors with improved thermal management are provided, including improvement in stress, temperature, and plasticity. The shape of the pressure and suction side platform edges may result more effective use of cooling holes and the other cooling techniques of the turbine rotor blade. Exemplary embodiments of the turbine airfoil discussed above have resulted in an ability to increase engine temperature, thereby improving fuel consumption and power density. The airfoils may be produced by any suitable manufacturing techniques, including casting, injection molding, and/or rapid prototyping. Computational fluid dynamic (CFD) analysis can additionally be used to optimize the location and orientation of the cooling holes to provide advantageous inlet and exit field conditions and regional cooling. Exemplary embodiments promote the service life and/or enhanced performance in a cost-effective manner. Each of the exemplary embodiments discussed above may be used in combination with one another. The turbine airfoils produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for producing a turbine rotor blade, comprising the following steps:
    performing a plastic analysis of a blade platform of a baseline turbine rotor blade with a first side edge and a second side edge;
    identifying a first area with plasticity greater than a predetermined limit on the first side edge;
    modifying the baseline turbine rotor blade to result in an intermediate turbine rotor blade by removing the first area from the first side edge such that a first concave portion is formed relative to a circumferential orientation and adding a second area, corresponding in size and shape to the first area, to the second side edge; and finishing the intermediate turbine rotor blade as a final turbine rotor blade.

2. The method of claim 1, wherein the modifying step includes modifying the baseline turbine rotor blade such that the first side edge is parallel to the second side edge.

3. The method of claim 1, wherein the airfoil has a pressure side wall and a suction side wall, and wherein the modifying step includes modifying the baseline turbine rotor blade such that the first side edge of the platform is non-parallel to the first side wall of the airfoil.

4. The method of claim 1, wherein the modifying step includes modifying the baseline turbine rotor blade such that the first side edge includes a first concave portion and a first convex portion.

5. The method of claim 1, wherein the modifying step includes modifying the baseline turbine rotor blade such that the first side edge is continuously curved from a leading edge to a trailing edge.

6. The method of claim 1, further comprising, after the modifying step,
    performing the plastic analysis of the blade platform of the intermediate turbine rotor blade; and
    identifying if the platform of the intermediate turbine rotor blade has a third area with platisticity greater than the predetermined limit.

7. The method of claim 6, further comprising, if the identifying step identifies the third further area with plasticity greater than the predetermined limit, modifying the intermediate turbine rotor blade by removing the third area from the first side edge or the second side edge and adding a fourth area, corresponding in size and shape to the third area, to an opposing side of the first side edge or the second side edge.

8. The method of claim 1, wherein the identifying step further includes identifying a third area with plasticity greater than the predetermined limit on the second side edge, and the modifying step further includes modifying the baseline turbine rotor blade by removing the third area and adding a fourth area, corresponding in size and shape to the third area, to an opposing side of the first side edge or the second side edge.

9. The method of claim 1, further comprising, prior to the performing step, applying a thermal and stress analysis on the baseline turbine rotor blade.

10. The method of claim 1, wherein the modifying step includes adding the second area such that a first convex portion, parallel to the first concave portion, is formed on the second side edge.

11. The method of claim 1, wherein the modifying step includes modifying the baseline turbine blade to result in the intermediate turbine blade with a continuously curved first side edge extending from a leading edge to a trailing edge.

12. The method of claim 1, further comprising, prior to the finishing step, providing stiffening ribs to the blade platform.

13. The method of claim 1, further comprising, prior to the finishing step, providing cooling channels within the blade platform.

* * * * *